R. D. Turner,
Ageing Liquors.
No. 96,056.   Patented Oct. 19, 1869.
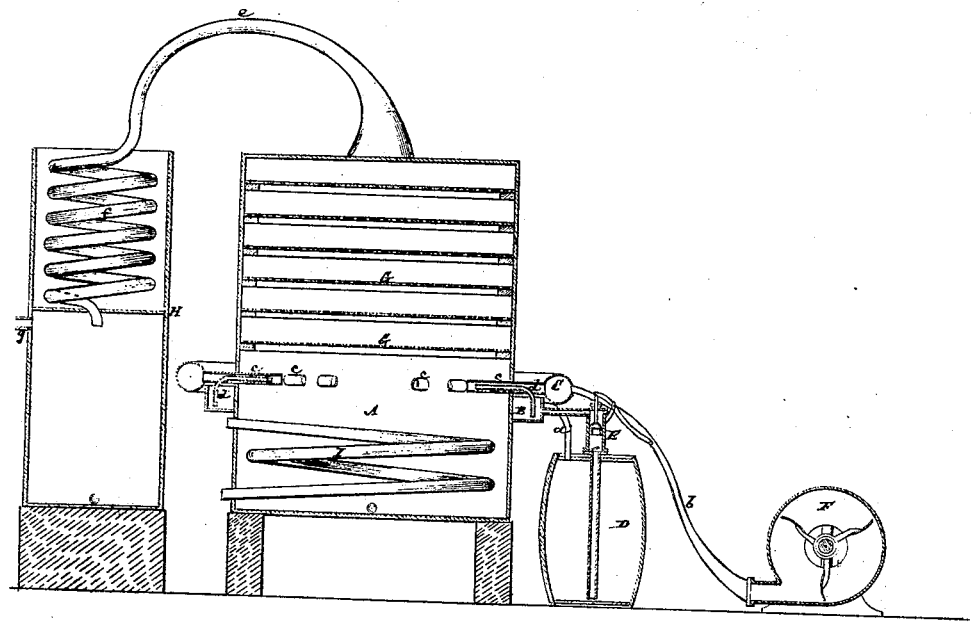
Witnesses:
Fred Haynes
R. E. Rabeau
Reuben D. Turner

UNITED STATES PATENT OFFICE.

REUBEN D. TURNER, OF NEW YORK, N. Y.

IMPROVED APPARATUS FOR AGING SPIRITUOUS LIQUORS.

Specification forming part of Letters Patent No. 96,056, dated October 19, 1869.

*To all whom it may concern:*

Be it known that I, REUBEN DANIEL TURNER, of the city, county, and State of New York, have invented a new and useful Improvement in the Treatment of Spirits or Alcoholic Liquors, of which the following is a full, clear, and exact description, reference being had to the accompanying drawing, forming part of this specification, and which represents a sectional elevation of an apparatus constructed to operate in accordance with my invention.

This invention is mainly designed to be applied to the purifying and refining of spirits, such as brandies, whiskies, gins, &c.

Prior to describing my invention, I would here observe that various apparatus have before been constructed for oxidizing the fusel and other injurious oils contained in such liquors by exposing the latter, in a stream or other like divided form, for a limited time, to contact with the atmosphere, so that, without producing acetification of the alcoholic principle, the volatile pyrogenous essences, including fusel, are resinified or oxidized, thereby depriving the same of their injurious or offensive qualities. Thus the spirit has been run, in a thin stream, over or through tortuous channels, also down or over hollow wicks. My invention widely differs from all these previous modes or means, and operates to improve the quality of the liquor by subjecting it, in minutely-separated particles or atomically, to the action of atmospheric air, so that the oxygen in the air produces, in an immediate or rapid manner, the desired effect upon the fusel or injurious oils, without loss of quantity in the liquor treated, and without danger to the aromatic or useful principles, or injury to the bouquet of the spirit. To attain this end it is an important and leading feature of my invention that the liquor to be treated be subjected, in a mist or spray form, to the chemical action of the air, or oxygen contained in the latter. The apparatus for the purpose may be variously modified; but one constructed as shown in the accompanying drawing will serve to illustrate how the invention may be put in practice.

A in said drawing represents a cylindrical or other shaped tank of any suitable dimensions.

B is an annular trough, (here represented as open, but which may be closed,) arranged to surround said tank at some distance from its bottom.

C is a closed hollow belt or tube, also made to encircle the tank outside of and above the trough.

D is a cask or other vessel containing the liquor to be treated, and which is supposed to be transferred to the trough B by a pump, E, and any surplus from the trough returned by a pipe, $a$, to the cask.

F is a blower of any suitable description, operating to throw a strong blast or current of air through a pipe, $b$, into the hollow belt C. Connected with this belt, on its inner side, is a series, in any desired number, of radial pipes, $c$, extending into the interior of the tank, and constituting, in connection with dip-tubes $d$, that project down into the liquor in the trough, and suitable nozzle attachments, a combination of tubes, such as are used in atomizers or spray apparatus of different kinds, or of any suitable construction that will produce a spray action or effect, so that on a strong blast or current of air being kept up in the belt C, and issuing along or out of the radial pipes $c$, liquor will be sucked or drawn up the tubes $d$ and distributed in a mist or spray form, along with atmospheric air supplied by the pipes $c$ from the nozzle ends of the latter within the tank A. In this way the liquor is subjected, atom by atom, to the improving effect of the oxygen contained in the air, each particle, as it were, surrounded by oxygen, instead of, as under previous methods, having only a stream or general surface exposure. The liquor thus treated falls to the bottom of the tank, from which it may be run off into any suitable receiver, while the air blown into the tank along with the liquor passes off above, preferably through fibrous or metallic strainers G, arranged in the upper portion of the tank, for the purpose of separating or detaching any liquid that may be carried along with the air as the latter is forced or passes off upward. To further arrest any loss of liquor by possible escape of it along with the air blown into the tank, said air, as it escapes after passing through the strainers, may be led by a pipe, $e$, to a worm, $f$, of a condenser, H, which will serve to catch or collect all remaining liquor, the air finally passing off by an outlet, $g$.

The process herein described may either be conducted under a natural or artificial and raised temperature. If the latter, the same may be secured by introducing a worm or coil of pipe, I, in the lower portion of the tank A and passing hot air or steam therethrough.

As before observed, numerous changes may be made in the apparatus without altering the principle of action involved in this invention, which, by oxidizing the liquor in a mist or spray form, in the manner described, effectually removes or changes, as required, all pyrogenous injurious principles and fusel without destroying any useful aromatic principle, but retaining the natural bouquet of the spirit and improving its flavor by adding to it that ordinarily acquired by age.

Wines, as well as spirits, may be treated according to this my improved process, and in some cases various gases may be introduced along with the air to act upon the liquor under treatment while in a spray form.

What is here claimed, and desired to be secured by Letters Patent, is—

1. The combination of the air-pipes $c$ and liquid-pipes $d$, arranged radially around the chamber A, substantially as and for the purpose set forth.

2. The combination of the strainer G with the spray-chamber A, and arranged above the spray-tubes $c\,d$ for the separation of the spray from the escaping air, substantially as set forth.

3. The combination of the liquid-channel B, air-channel C, and their pipes $c\ d$ with the chamber A, arranged and operating substantially as and for the purpose specified.

4. The combination of the condenser H with the tank A and its spray pipes or tubes $c\ d$, substantially as set forth.

5. The combination of the coil I with the tank A and its spray pipes or tubes, essentially as and for the purpose specified.

REUBEN D. TURNER.

Witnesses:
FRED. HAYNE,
HENRY PALMER.